C. CRATTY.
DUST CAP.
APPLICATION FILED JULY 2, 1917.
1,267,636.
Patented May 28, 1918.
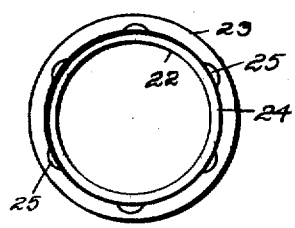
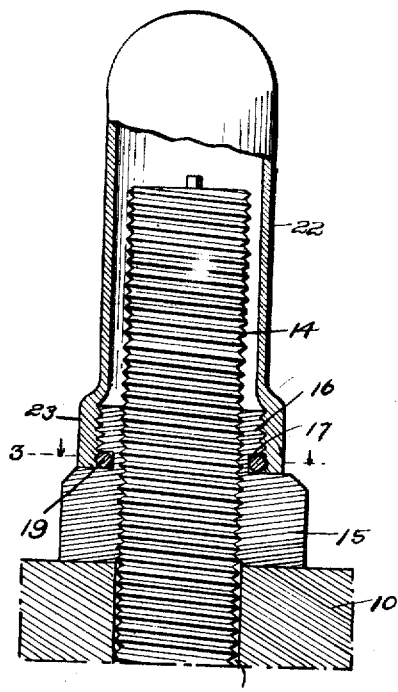
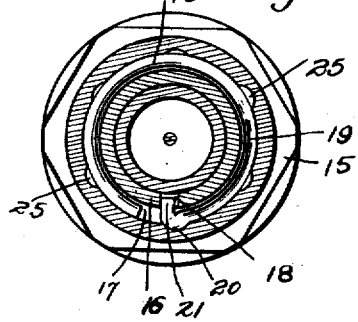
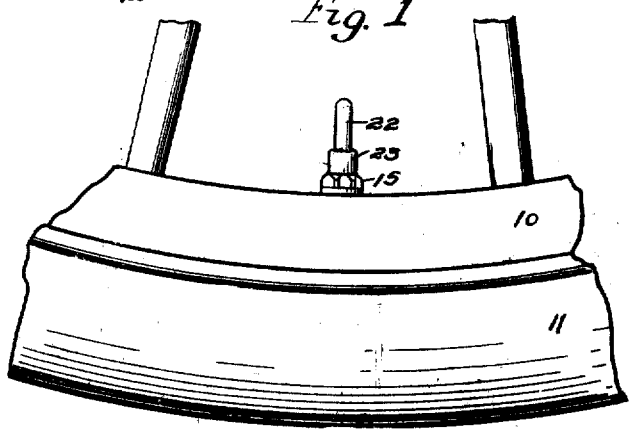
INVENTOR
Charles Cratty
BY Craig & Bair ATTYs

UNITED STATES PATENT OFFICE.

CHARLES CRATTY, OF GRINNELL, IOWA.

DUST-CAP.

1,267,636.  Specification of Letters Patent.  Patented May 28, 1918.

Application filed July 2, 1917. Serial No. 178,272.

*To all whom it may concern:*

Be it known that I, CHARLES CRATTY, a citizen of the United States, and resident of Grinnell, in the county of Poweshiek and State of Iowa, have invented a certain new and useful Dust-Cap, of which the following is a specification.

The object of my invention is to provide a dust cap for wheels of motor vehicles, and the like, which is so constructed and arranged that the cap may be very quickly and easily removed or installed for protecting the valve stem, and which, when in installed position, is locked against accidental removal.

With these and other objects in view my invention consists in the construction and arrangement of the various parts of the device, whereby the objects contemplated are attained, as hereinafter more fully set forth, pointed out in my claim, and illustrated in the accompanying drawings, in which:

Figure 1 shows a side elevation of a part of the rim of the vehicle wheel equipped with a dust cap embodying my invention.

Fig. 2 shows a vertical, sectional view through a portion of the rim and my improved dust cap, showing the method of mounting the same for protecting the valve stem.

Fig. 3 shows a horizontal, sectional view taken on the line 3—3 of Fig. 2, and

Fig. 4 shows an inverted plan view of the removable portion of the dust cap.

In the accompanying drawings, I have used the reference numeral 10 to indicate generally the rim of a wheel of the type adapted to support a pneumatic tire 11.

The rim 10 is provided with an opening 12 extended through it to receive the externally screw-threaded cylindrical member 14, commonly called "a valve stem." The member 14 is the protective member for the valve, and the member which receives the cover cap, which member is ordinarily attached to the inner tube of the pneumatic tire, and is extended through the opening 12 in the manner shown in Fig. 2.

In the form of my dust cap shown in the accompanying drawings, a base 15 is provided with a central, screw-threaded opening, and is screwed downwardly over the stem 14 to fit snugly against the rim 10, as illustrated in Figs. 1 and 2.

The base 15 has an upwardly extending sleeve 16 formed thereon, and extended radially inwardly with relation to the wheel, as illustrated in Fig. 2. The sleeve 16 is internally screw-threaded to fit the stem 14, and is also externally screw-threaded, and is of considerably smaller total diameter than the body of the base 15.

In its upper surface adjacent to the body of the base 15, the sleeve 16 is provided with an annular groove 17, shown in Figs. 2 and 3. At one point, the sleeve 16 is provided with an inwardly extending hole 18 communicating at its outer end with the groove 17.

Received in the groove 17 is an annular, broken ring 19, which is made of spring metal, preferably cylindrical in cross section, as illustrated in Fig. 2. At one end the ring 19 is formed with a portion 20 which extends slightly outwardly, formed on which portion is an inwardly extending point 21, received in the hole 18, as illustrated in Fig. 3.

As before mentioned, the cylindrical extension 16 is externally screw-threaded above the groove 17.

I provide a cylindrical cover cap 22 closed at one end, as shown, and having at its open end a portion 23 of greater diameter than the body of said cap and internally screw-threaded to fit the extension 16, except at its extreme end where said portion 23 is provided with an annular groove 24 in which are formed a series of spaced recesses 25.

In the practical use of my improved quick acting dust cap, the base 15 is screwed on to the so called stem 14 until it fits snugly against the rim 10.

The ring 19 is placed in position, as shown in Figs. 2 and 3 and the cover cap 22 may then be screwed on to the extension 16, until its open end engages the base 15, as shown in Fig. 2. When the cover cap 22 reaches its latter position it may be screwed on until the portion 20 is received in one of the recesses 25. The resiliency of the ring 19 tends to normally spring the portion 20 outwardly causing it to be forced into one of the recesses 25 whenever one of said recesses is opposite the portion 20.

When none of said recesses 25 are opposite th portion 20, the portion 20 will be forced inwardly somewhat thereby forcing the member 21 inwardly in the hole 18.

The ring 19 thus serves as a lock for preventing the unscrewing of the cap 22 on account of ordinary vibration of the machine.

The cap 22, however, can be readily unscrewed and removed by exerting enough force to press the portion 20 inwardly, during the first part of the unscrewing movement.

The advantages of my improved quick acting dust cap may be largely seen from the foregoing description.

The base 15 is mounted on the valve stem and need not be removed ordinarily for filling the inner tube with air.

The cover cap 22 is locked in position against accidental removal and yet may be quickly and easily removed for filling the inner tube by screwing it only a comparatively short distance. I thus do away with the disadvantage of unscrewing the cover cap which must be unscrewed from the greater portion of the length of the valve stem, and thereby effect a considerable saving of time, each time the tube is filled.

Some changes may be made in the construction and arrangement of the parts of my device, without departing from the essential features and purposes of my invention, and it is my intention to cover by my improved device, any such changes in construction or use of mechanical equivalents, as may be included within the scope of my claim.

I claim as my invention:

In a device of the class described, a base having a central screw-threaded opening, said base being adapted to be screwed on to the externally screw-threaded valve casing on an inner tube, and fit against a vehicle wheel rim, said base having a sleeve thereon provided with external screw-threads, and provided adjacent to said base with an annular groove and with a hole, a spring received in said groove having at one end an outwardly extending portion, and an inwardly extending member received in said hole, a cover cap closed at one end, and having at its open end a portion of larger diameter than its main body, internally screw-threaded to fit said sleeve, said larger portion having near its open end an internal groove having spaced recesses.

June 2, 1917, Des Moines, Iowa.

CHARLES CRATTY.